(12) United States Patent
Schemp

(10) Patent No.: US 7,914,032 B2
(45) Date of Patent: Mar. 29, 2011

(54) MOTORCYCLE LEG REST

(75) Inventor: Kevin Lee Schemp, Berthoud, CO (US)

(73) Assignee: Kick Rest, LLC, Berthoud, CO (US)

( * ) Notice: Subject to any disclaimer, the term of this patent is extended or adjusted under 35 U.S.C. 154(b) by 95 days.

(21) Appl. No.: 12/156,752

(22) Filed: Jun. 4, 2008

(65) Prior Publication Data
US 2009/0302569 A1    Dec. 10, 2009

(51) Int. Cl.
*B62J 25/00* (2006.01)
*G05G 1/60* (2008.04)

(52) U.S. Cl. .......... 280/291; 280/304.3; 296/75; 74/564

(58) Field of Classification Search ............... 280/288.4, 280/291, 304.3; 296/75; 74/564
See application file for complete search history.

(56) References Cited

U.S. PATENT DOCUMENTS

| | | | |
|---|---|---|---|
| 1,525,864 A * | 2/1925 | Hueseman | 297/423.27 |
| 2,473,947 A * | 6/1949 | Hamstrom | 297/423.45 |
| 4,451,057 A | 5/1984 | Lawson | |
| D338,643 S | 8/1993 | Fuller et al. | |
| 5,454,580 A * | 10/1995 | Lin | 280/291 |
| 6,663,129 B1 | 12/2003 | Smith | |
| 6,893,038 B2 | 5/2005 | Egan | |
| 7,025,369 B1 | 4/2006 | Sine | |
| 7,104,157 B1 * | 9/2006 | Hilliard | 74/564 |
| 7,431,118 B1 * | 10/2008 | Hogg | 180/219 |
| 2003/0209876 A1 * | 11/2003 | Elliott | 280/291 |
| 2006/0055148 A1 * | 3/2006 | Patch | 280/288.4 |
| 2007/0057484 A1 * | 3/2007 | Gilman | 280/291 |
| 2007/0063479 A1 * | 3/2007 | Fouhy | 280/288.4 |

* cited by examiner

Primary Examiner — Lesley Morris
Assistant Examiner — Marc A Scharich
(74) Attorney, Agent, or Firm — William E. Hein

(57) ABSTRACT

A motorcycle accessory allows a user to rest their leg in a cradle, the leg cradle supported by a body which body is in turn clamped to the frame, crash bars, forks or other parts of the motorcycle. The leg cradle may be hinged so that it can be moved between a position for supporting the leg to a position allowing the rider to put their foot onto the body in a manner similar to a highway peg. The device may be made of aluminum, metal, polymer and so on, and may be customized with indicia. Padding on the leg cradle may increase the user's level of comfort.

8 Claims, 5 Drawing Sheets

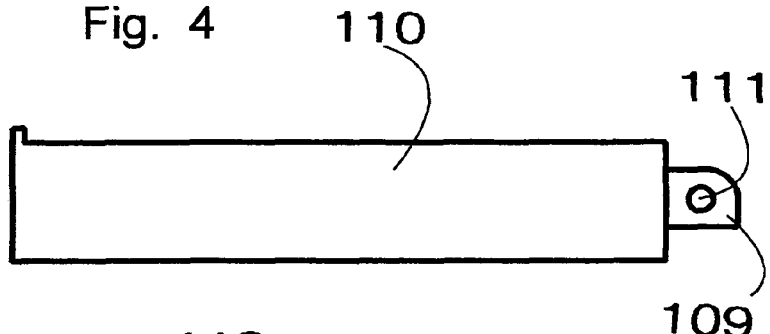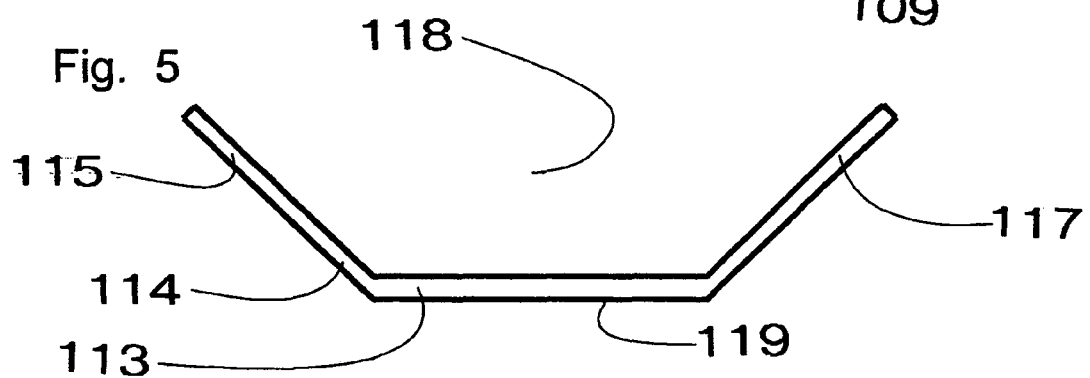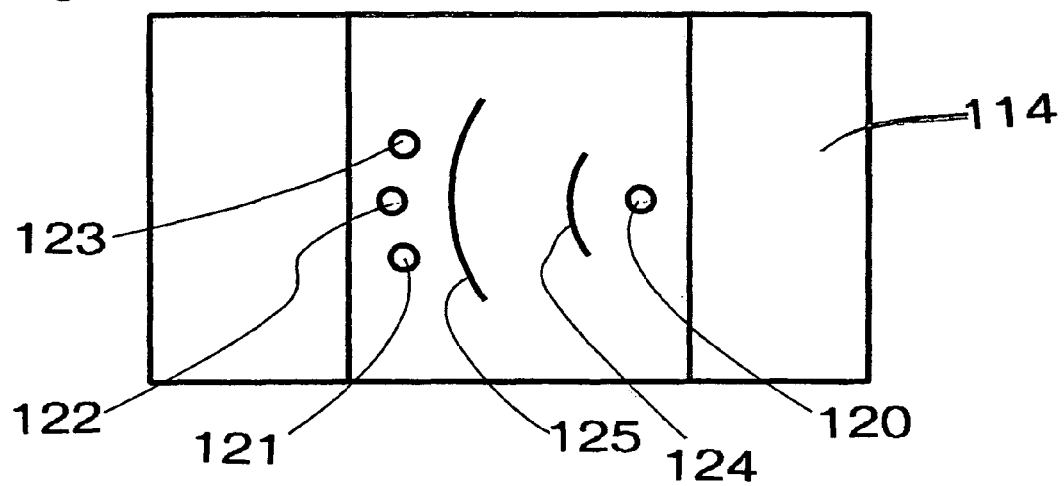

MOTORCYCLE LEG REST

STATEMENT REGARDING FEDERALLY FUNDED RESEARCH

This invention was not made under contract with an agency of the US Government, nor by any agency of the US Government.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

N/A

FIELD OF THE INVENTION

This invention relates generally to motorcycle accessory devices, and specifically to motorcycle frame leg rest devices.

BACKGROUND OF THE INVENTION

Motorcycle riding over long distances, or when a rider is injured, can present surprising challenges to the rider's endurance. Any rider will suffer leg cramps and discomfort during a long highway ride. Riders suffering from a disability, such as a leg injury requiring a wrapping or cast, are at additional disadvantages: it can be difficult merely to support one's leg on a motorcycle, even if the controls have been modified to allow proper operation without use of one set of pedals. In addition, deep vein thrombosis, a problem common on airline flights, can also occur on long motorcycle rides. This problem occurs specifically because of an inability to alter posture and leg position.

In an effort to add to the comfort level of long rides, many riders resort to "highway pegs": pegs or fixed pedals custom installed on the frame of the motorcycle at a convenient location to allow the rider to place their feet on the pegs. Usually such pegs are installed forward of the manufacturers' pedals, so that the rider may have a choice of postures for the long ride. The reach from the rider and seat to the highway pegs allows the rider to straighten their legs and later their entire posture as well, thus increasing comfort and safety.

However, since the highway pegs are in fact merely projections from the motorcycle, there is little utility or comfort in placing anything except the sole of a riding boot on the peg.

It would be preferable to provide a device allowing riders to rest their legs and thus increase safety and comfort on long rides, and to allow additional postures for comfort.

It would further be preferable to provide a device allowing riders with injured legs or feet to rest a leg, dressing, or cast on the motorcycle.

A search in the collection of the United States Patent and Trademark Office reveals little that is useful in providing additional options beyond highway pegs.

U.S. Pat. No. 7,025,369 issued Apr. 11, 2006 to Sine, teaches a stirrup vaguely similar to the type used for horseback riding. It does not teach anything away from supporting the foot of the user.

U.S. Pat. No. 6,893,038 to Egan on May 17, 2005, teaches a heel rest for a highway peg: the rest can swing in a horizontal plane. It does not teach anything away from supporting the foot of the user.

U.S. Pat. No. 6,663,129 to Smith on Dec. 16, 2003, teaches a highway peg which rotates but does not otherwise differ from known highway pegs. It does not teach anything away from supporting the foot of the user.

U.S. Pat. No. 4,451,057 to Lawson on May 29, 1984 teaches an elongated "running board" for a motorcycle, which is identified as a "foot rest". It does not teach anything away from supporting the foot of the user.

U.S. Pat. No. d338643 to Fuller et al on Aug. 24, 1993 teaches a "heelrest" vaguely similar in shape to a pedal for a motorcycle, but as it is identified as a "heelrest", it does not teach anything away from supporting the foot of the user.

Thus, for reasons of comfort, safety, and for assistance to disabled or injured motorcycle riders, it would be advantageous to provide a device teaching support of a leg, rather than a foot, on a motorcycle frame, crash bar, or other motorcycle structure.

SUMMARY OF THE INVENTION

General Summary

The present invention teaches that a motorcycle accessory may allow a motorcycle rider to rest their leg in a cradle. The cradle may be dimensioned and configured to comfortably support the rider's leg either having a width dimensioned for the average rider's leg in pants or chaps, or may have a width sufficient to support a rider's leg in medical dressings.

The leg cradle is in turn supported by a sturdy body support, which may take the form of a projection from the axis of the motorcycle. The body, padding, and other parts may have thereon indicia in the form of incising, stitching, decals, stickers, painting, printing and any other type, which indicia may include the rider's name, product or corporate names or logos, political or social statements, interesting or eye-catching designs or the like.

The body support is in turn clamped to the frame, crash bars, forks or other parts of the motorcycle. The leg cradle may be hinged so that it can be moved between a position for supporting the leg to a position allowing the rider to put their foot onto the body in a manner similar to a highway peg. The device may be made of aluminum, metal, polymer and other strong materials suitable for vehicle use.

Padding on the leg cradle may increase the user's level of comfort.

SUMMARY IN REFERENCE TO CLAIMS

It is therefore another aspect, advantage, objective and embodiment of the invention, in addition to those discussed previously, to provide a motorcycle accessory for use by a motorcycle rider, the motorcycle accessory comprising:

a body support having first and second ends and having a first attachment at or near the first end and a second attachment;

a leg cradle secured by the second attachment to the body support, the leg cradle dimensioned and configured to support a leg of the motorcycle rider;

the first attachment dimensioned and configured to secure the motorcycle accessory to a motorcycle.

It is therefore another aspect, advantage, objective and embodiment of the invention to provide a motorcycle accessory wherein the second attachment further comprises: a hinge It is therefore another aspect, advantage, objective and embodiment of the invention to provide a motorcycle accessory wherein the hinge further has at least a first position in which the leg cradle is disposed on a top side of the body support and oriented to support the motorcycle rider's leg, and a second position in which the leg cradle is disposed on a side of the body support and not oriented to support the motorcycle rider's leg.

It is therefore another aspect, advantage, objective and embodiment of the invention to provide a motorcycle accessory wherein the hinge further comprises:

a spring, the spring urging the hinge into the first position.

It is therefore another aspect, advantage, objective and embodiment of the invention to provide a motorcycle accessory wherein the leg cradle further comprises:

padding.

It is therefore another aspect, advantage, objective and embodiment of the invention to provide a motorcycle accessory wherein the first attachment further comprises:

a clamp dimensioned and configured to engage such motorcycle.

It is therefore another aspect, advantage, objective and embodiment of the invention to provide a motorcycle accessory further comprising:

decorative indicia on the body support.

It is therefore another aspect, advantage, objective and embodiment of the invention to provide a motorcycle accessory further comprising:

decorative indicia on the padding.

It is therefore another aspect, advantage, objective and embodiment of the invention to provide a motorcycle accessory further comprising a metal material for the leg cradle and body support.

It is therefore another aspect, advantage, objective and embodiment of the invention to provide a motorcycle accessory wherein the metal further comprises: aluminum.

It is therefore another aspect, advantage, objective and embodiment of the invention to provide a motorcycle accessory further comprising a polymer material for the leg cradle and body support.

BRIEF DESCRIPTION OF THE DRAWINGS

FIG. 4 is a top view of the body support (which may itself also function as a highway peg).

FIG. 5 is a front view of the leg cradle of the invention.

FIG. 6 is a bottom view of the leg cradle of the invention, showing details of the leg cradle which cooperate with the hinge to secure the leg cradle to the body support.

DETAILED DESCRIPTION

Figure 1:
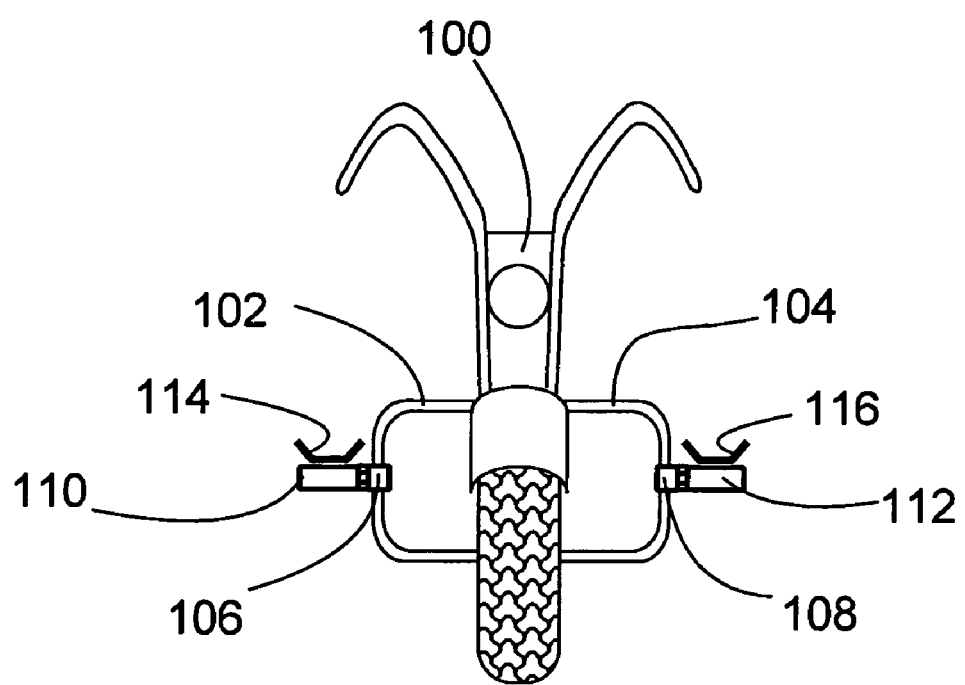
FIG. 1 is a partial front view of a motorcycle equipped with the device of the invention on the outside of both crash bars.

FIG. 1 is a partial front view of a motorcycle equipped with the device of the invention on the outside of both crash bars. Motorcycle 100 is simplified for clarity. Crash bar 102 and crash bar 104 are in the position shown for mounting in FIG. 1: the crash bars 102 and 104 have attached thereto respective clamps 106 and 108. These clamps (discussed later in reference to FIG. 10) may encircle the crash bars and have a very strong frictional engagement thereto (be clamped thereto). Respective body support 110 and body support 112 project from the motorcycle connection points (crash bars, frame, etc) and support respective leg cradles 114 and 116. Body supports 110, 112 may each have two attachments. The first is at the end and connects the device to the clamp, or more broadly, is the tang and clamp. The second attachment may be elsewhere on the body support and connects the body support to the leg cradle.

Most of the structural members of the device may be made of aluminum, other metals, composites, polymers, or combinations thereof.

Figure 2:
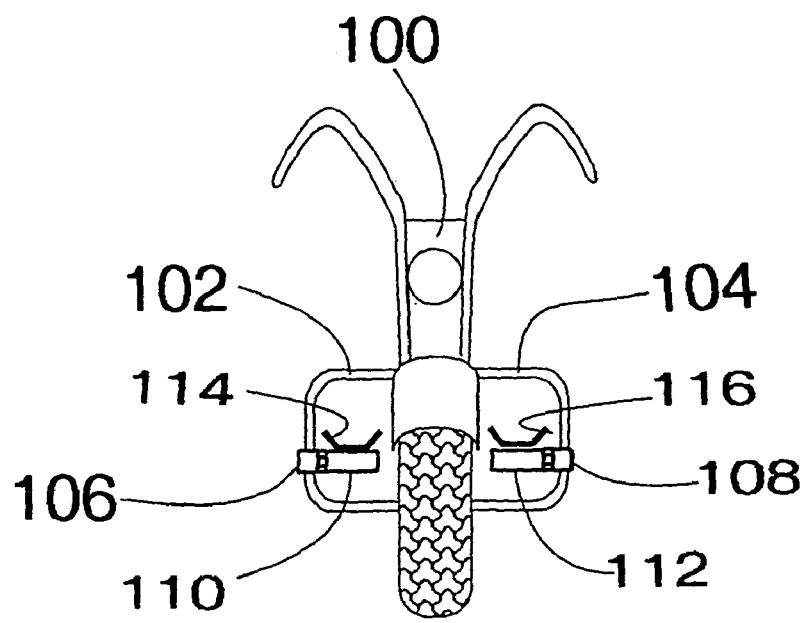
FIG. 2 is a partial front view of a motorcycle equipped with the device of the invention on the inside of both crash bars.

FIG. 2 is a partial front view of a motorcycle equipped with the device of the invention on the inside of both crash bars. Motorcycle 100 again is simplified, with extraneous parts not shown. Crash bar 102 and crash bar 104 customarily stand out from the side of the motorcycle 100 by a large distance (exaggerated for clarity in the FIGS. 1 and 2), but this allows clamp 106 and clamp 108 to be used to secure body support 110 and body support 112 on the inside of the area traced by the crash bars 102 and 104. This in turn means that respective leg cradles 114 and 116 are actually located on the inside of the crash bar's area, allowing riders to rest their legs on the leg cradles at an angle considerably closer to the axis of the motorcycle 100 and a seat 101.

Figure 3:
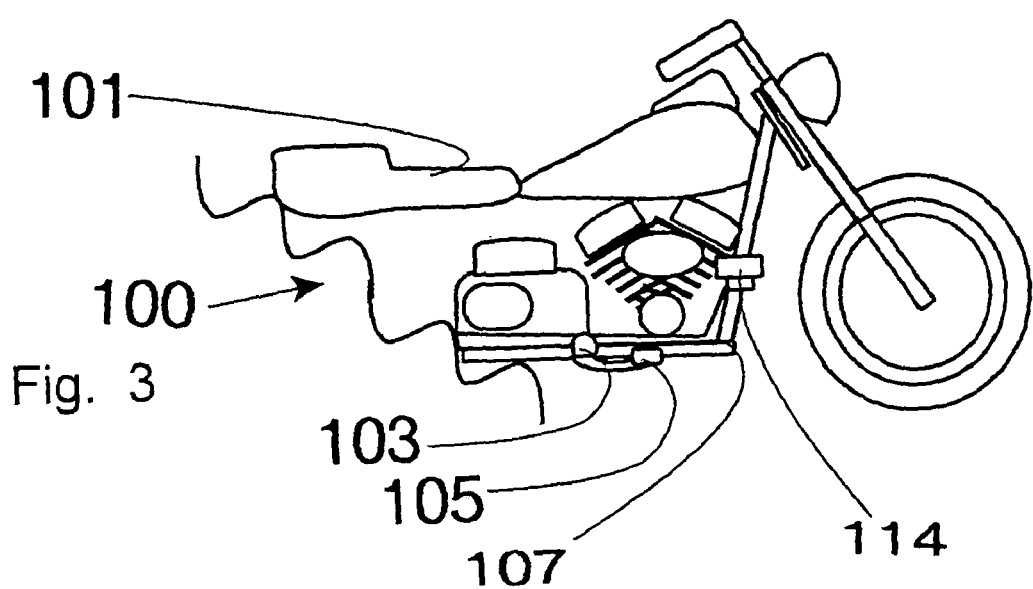
FIG. 3 is a partial side view of a motorcycle equipped with the device of the invention on the frame of the motorcycle.

FIG. 3 is a partial side view of a motorcycle equipped with the device of the invention on the frame of the motorcycle. Motorcycle 100 has been very greatly simplified for clarity in this case, and is shown only from the seat 101 forward. Seat 101 is obviously the location at which the rider will sit, while foot rest/pedal 103, 105 is an example of the pedal controls of a motorcycle and the location at which a rider may advantageously place their feet while involved in driving requiring frequent use of the pedal controls. (Note that motorcycle controls do actually vary a bit, and thus not all foot rests are necessarily controls.)

A frame 107 of the motorcycle 100 may provide various advantageous positions for the location of the device of the invention, thus allowing for example, leg cradle 114 to be disposed and attached at various positions relative to the axis of the motorcycle.

FIG. 4 is a top view of the body support 110, 112 (only body support 110 is shown for clarity) which may itself also function as a highway peg. Body support 110 has a first attachment portion tang 109 at one end, which cooperates with a clamp (for example, clamp 106) to secure the device to the motorcycle 100. Aperture 111 may have a bolt or other fastener passed therethrough in order to effect this attachment to the clamp.

It will be noted that when the leg cradles discussed below are moved to a position clear of the normal top/front of the device, the body support functions as a highway peg, that is, the user can easily rest the sole of their boot on the device. Holes, projections, tabs, treads and the like may serve to increase the friction of the boot sole on the body support, for example, the small tab seen in the diagrams.

FIG. 5 is a front view of the leg cradle 114,116 of the invention (only leg cradle 114 is shown for clarity). Leg cradle 114 has a bottom portion 113 and two raised areas, upright 115 and upright 117 which together define interior space 118. Interior space 118 may be dimensioned and configured to support a calf of a motorcycle rider's leg. By this means, the body support 110 may be positioned at a convenient location to serve as a highway peg, yet the leg cradle 114 atop it may allow the user an alternative posture with their leg fully extended and the foot considerably past (forward of) the device, the calf resting comfortably on the leg cradle. The leg cradle may also be dimensioned and configured to allow a user having their leg in a dressing or cast to use the leg cradle in the exact same way: widening of the leg cradle will fit this definition of the term "dimensioned and configured to support the rider's leg". By this means an incapacitated individual may ride a motorcycle with relative safety (leg secured and supported) while an individual without any disability may ride the motorcycle in a choice of at least two postures (actually three): a first posture with the feet on pedals, a second posture with the feet on the device and the device serving as a highway peg, and a posture with the leg supported by the leg cradle.

FIG. 6 is a bottom view of the leg cradle 114, 116 of the invention (only leg cradle 114 is shown for clarity), showing details of the leg cradle which cooperate with the hinge to secure the leg cradle to the body support. Pivot-point aperture 120 is a first aperture through which a fastener such as a bolt or rivet may pass, securing the leg cradle to the body support. This fastener then serves as a pivot point about which the leg cradle and body support may rotate relative to one another. It will be appreciated that the body support is more firmly attached to the motorcycle and does not substantially pivot relative to the motorcycle (at least, not in the horizontal plane, the device may rotate vertically to be out of the way). By allowing the leg cradle to rotate horizontally relative to the body support and vehicle, however, the device allows the user to find a comfortable angle of the leg cradle relative to the vehicle. Adjustment apertures 121, 122 and 123 then may be selected by the user/installer for passage of a second fastener (rivet, bolt, etc), thus fixing in place the desired angle. A single arcuate aperture may also be employed instead of multiple apertures, as may a slide, track, rail, race and so on and so forth.

Spring end grooves 124 and 125 are very small scores in the undersurface of the leg cradle, in place to allow the spring ends to rest below the level of the surface of the leg cradle. This is necessary in order to achieve a closer, more secure fit of the leg cradle to the body support: if not used, the spring has ends which project from the hinge and prevent the leg cradle and body support from resting on one another. Again, in place of the arcuate scores shown, multiple apertures, slides, tracks, rails, races and so on may be employed instead.

Figure 7:
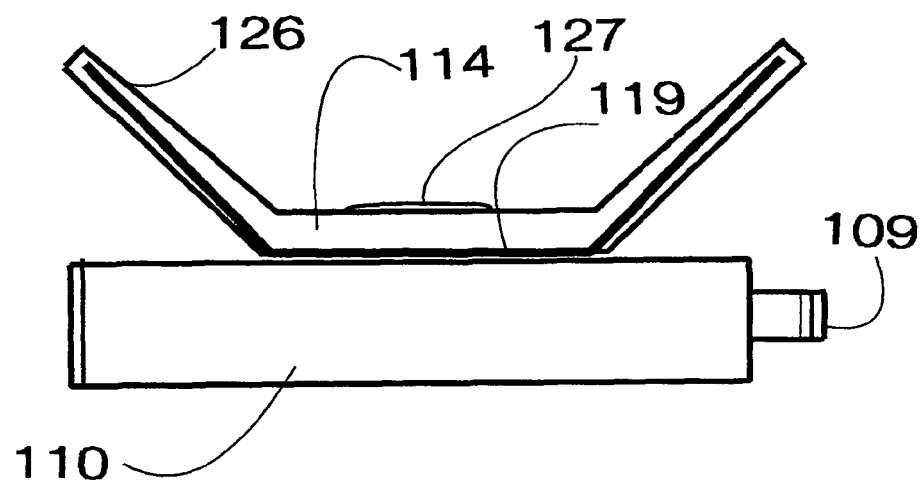
FIG. 7 is a front view of the invention showing the leg cradle and body support in the normal position of use, with the leg cradle mounted in straight alignment.

FIG. 7 is a front view of the invention showing the leg cradle 114 and body support 110 in the normal position of use, with the leg cradle 114 mounted in straight alignment. Padding 126 may cover leg cradle 114 on every side except the bottom surface 119 (leaving bottom surface 119 free so as to create a solid rest on the body support 110), or the padding 126 may be partial or may be omitted entirely.

Indicia 127 may be the marks or trademarks of motorcycle makers, sports teams, beverages or any other consumer product, identification with political, sports, media figures and so on, may be common symbols such as skulls and crossed bones, roses, revolvers and so on. It may be stitched, adhesive decal, dye transfer, applique and so on and so forth.

Figure 8:
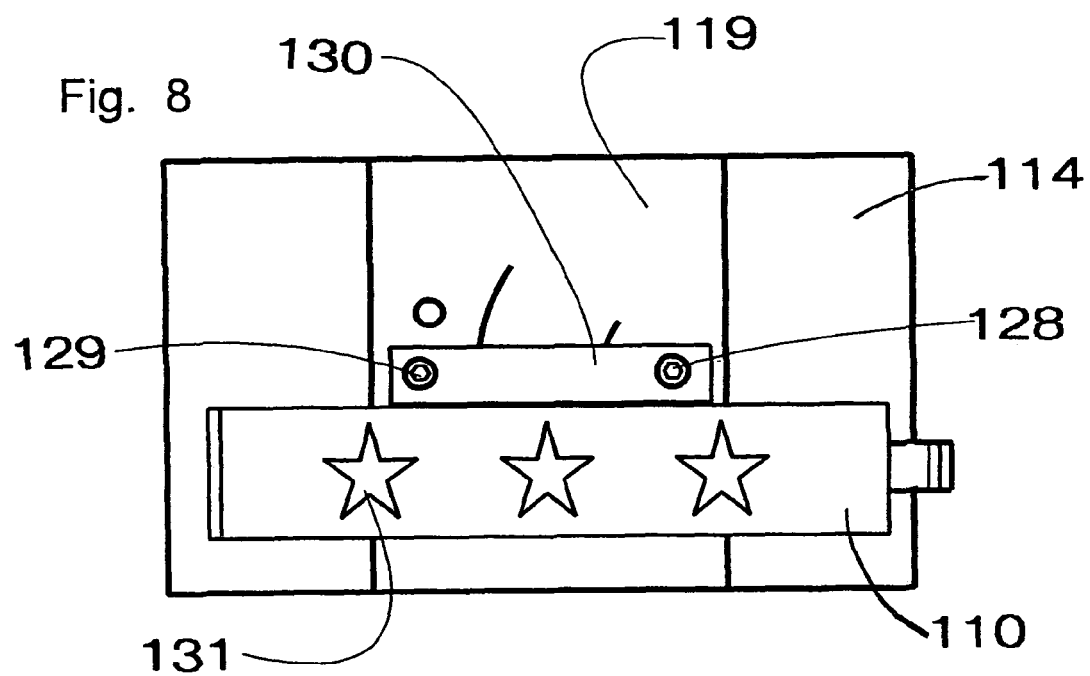
FIG. 8 is also a front view of the invention showing the leg cradle and body support, however, this view shows the device of the invention in an alternative position of use with the leg cradle folded forward, thus also partially displaying the hinge which connects the leg cradle and body support.

FIG. 8 is also a front view of the invention showing the leg cradle 114 and body support 110, however, this view shows the device of the invention in the alternative position of use with the leg cradle 114 folded forward, thus also partially displaying the hinge which connects the leg cradle 114 and body support 110.

Fasteners 128 and 129 may be seen: fastener 128 passes through the pivot aperture (hidden) while fastener 129 passes through one of the adjustment apertures (hidden). (For discussion of these apertures, see the discussion of FIG. 6). Hinge flap 130, a portion of the hinge connecting the body support and leg cradle, may be seen obscuring portions of the bottom surface 119.

Indicia 131 may be seen on the body support, and may be etched, enameled, welded thereto and so on. Indicia 131 may have any common indicia meaning or content, as may indicia 127.

It is important to understand the difference between FIGS. 7 and 8.

FIG. 7 shows the device with the leg cradle in a first position, the position allowing a leg to rest therein. FIG. 8 shows the device from the exact same view point as FIG. 7, however, the leg cradle has been rotated (by means of the hinge) into a second position such that the leg cradle is now out of the way of the user's boot, which may be placed on the body support like a highway peg.

Thus, of the three user postures discussed previously in reference to FIG. 5, the position of the device of FIG. 7 would correspond to the third rider posture (leg supported, foot extending beyond the device) while the position of the device shown in FIG. 8 would correspond to the second rider posture (foot on the device like a highway peg). None of the prior art show a device having multiple postures (or even leg cradles at all) for motorcycle riders.

Figure 9:
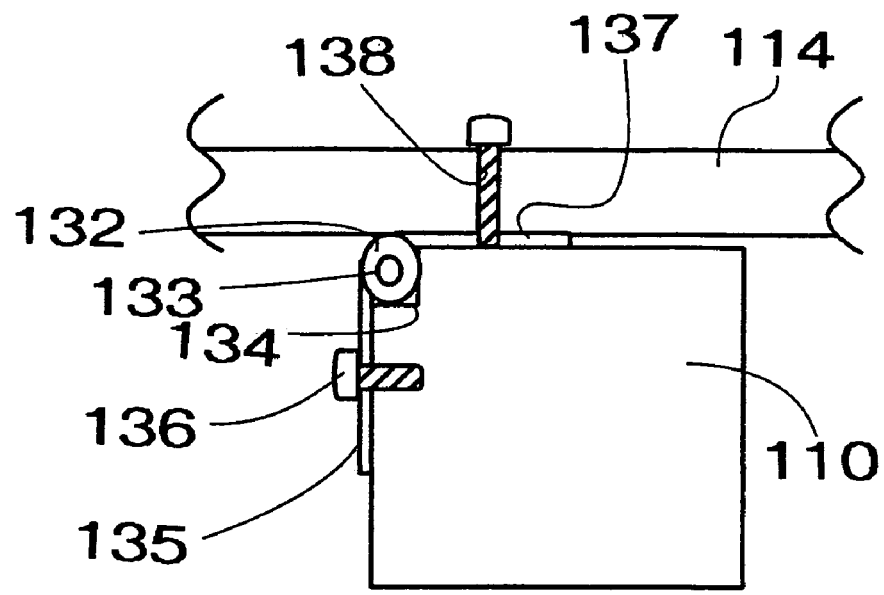
FIG. 9 is a partially cross-sectional side view of the device showing details of the hinge and bolts which attach the leg cradle and body support.

FIG. 9 is a partially cross-sectional side view of the device showing details of the hinge and bolts which attach the leg cradle and body support. Hinge 132 is visible along with spring 133, which will tend to urge the device into one position or the other. Hinge bed 134 is a space cut into the body support 110 so as to make room for the hinge 132. Hinge flap 135 is secured to the body support 110 by means of fastener 136, which projects all the way through and well into the body support 110. On the other hand, hinge flap 137 (previously seen as hinge portion 130 of FIG. 8) is secured to leg cradle 114 by means of the fastener 138, which does not project into the body support 110 but rather into the leg cradle 114. Note that if the head of fastener 138 is selected carefully, so as not to disturb the ride of the leg cradle 114 on the body support 110, then it becomes possible to have the fastener 138 project the opposite direction, that is, from the hinge flap 137 upward into the leg cradle 114.

Hinge 132 thus serves as a second attachment, that of the body support 110 to the leg cradle 114.

FIG. 9 depicts the position shown in FIG. 7, that is, the leg cradle deployed for leg resting posture.

Figure 10:
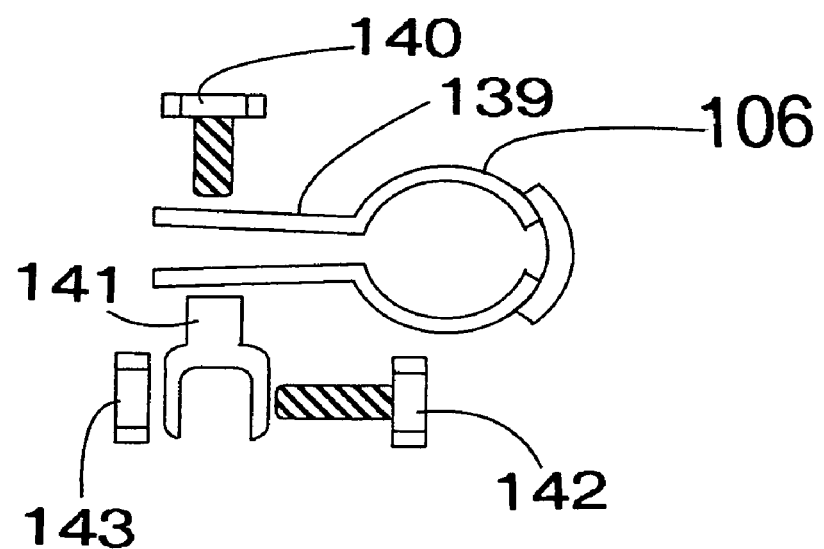
FIG. 10 is an exploded view of a clamp suitable for attaching the device of the invention to a motorcycle.

FIG. 10 is an exploded view of a clamp 106, 108 (only clamp 106 is shown for clarity) suitable for attaching the device of the invention to a motorcycle. Clamp 106 will pass about motorcycle frame 107, crash bars 102 and 104 or other parts, while clamp extension 139 has an aperture allowing clevis bolt 140 to pass therethrough and into clevis 141, thus simultaneously securing the clevis 141 to the clamp 106 and also clamping the clamp 106 about whatever vehicle part passes through the interior space of the clamp 106. Tang bolt 142 will pass through the aperture 111 of tang 109 of body support 110 of FIG. 4, and into or through tang bolt nut 143, thus serving as a first attachment of the body support 110 to the motorcycle.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A motorcycle accessory for use by a motorcycle rider, the motorcycle accessory comprising:
    a body support having first and second ends and having a first attachment at or near the first end and having a second attachment; and
    a leg cradle secured by the second attachment to the body support, the leg cradle dimensioned and configured to support a leg of the motorcycle rider;
    the first attachment dimensioned and configured to secure the motorcycle accessory to a motorcycle;
    the second attachment comprising a hinge having at least a first position in which the leg cradle is disposed on a top side of the body support and oriented to support the motorcycle rider's leg, the hinge having a second position in which the leg cradle is disposed on a side of the body support and not oriented to support the motorcycle rider's leg, the hinge further comprising a spring for urging the hinge into said first position.

2. A motorcycle accessory as in claim 1, wherein the leg cradle further comprises padding covering one or more surfaces thereof.

3. A motorcycle accessory as in claim 2, further comprising decorative indicia on the padding.

4. A motorcycle accessory as in claim 1, wherein the first attachment further comprises a clamp dimensioned and configured to engage the motorcycle.

5. A motorcycle accessory as in claim 1, further comprising decorative indicia on the body support.

6. A motorcycle accessory as in claim 1, wherein the leg cradle and body support comprise a metal material.

7. A motorcycle accessory as in claim 6, wherein the metal material comprises aluminum.

8. A motorcycle accessory as in claim 1, wherein the leg cradle and body support comprise a polymer material.

* * * * *